Nov. 29, 1949  R. G. WINDHAM  2,489,511
GROOVE-FORMING CUTTER
Filed Nov. 8, 1947

Inventor
ROMIE G. WINDHAM
C. G. Stratton
Attorney

Patented Nov. 29, 1949

2,489,511

UNITED STATES PATENT OFFICE 2,489,511

GROOVE-FORMING CUTTER

Romie G. Windham, Compton, Calif.

Application November 8, 1947, Serial No. 784,895

7 Claims. (Cl. 69—1)

This invention relates to cutters for forming grooves in the shoe soles that are cemented to shoe uppers.

An object of the present invention is to provide a cutter which will form such grooves in a leather sole to serve as means for keying the cement employed for affixing said sole to an upper, said grooves rather being formed by a division or separation of the leather than by any removal of material.

Another object of the invention is to provide a cutter, the teeth of which are more particularly formed and spaced to effect a parting of the leather of a sole whereby the resultant grooves, while receptive of a material such as glue or cement, will seek to close upon application of the pressure employed in affixing a sole to an upper.

Another object of the invention is to provide a novel and integral cutter for the purposes indicated that has groove-forming teeth which do not cut away material but rather part the same to thereby have a minimum resistance to the movement of a shoe sole relative to the cutter with attending ease and facility to form such grooves.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
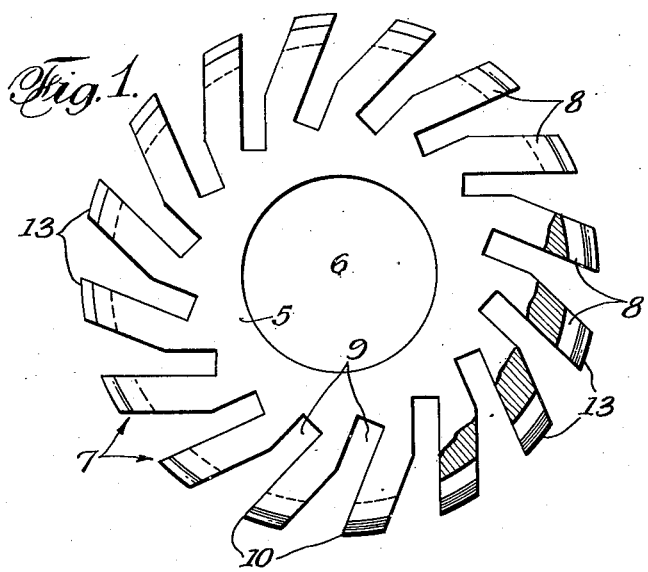
Figure 1 is a side elevational view, partly in section of a fluted grooving cutter according to the present invention.
Figure 2:
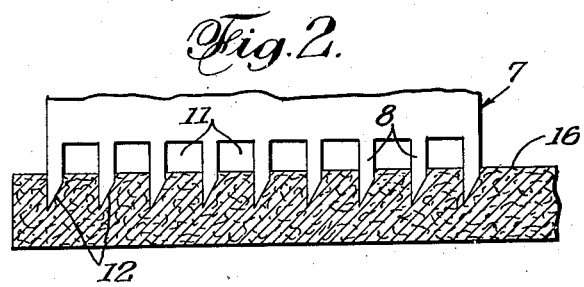
Figure 2 is an enlarged fragmentary view, transverse to Figure 1, of one flute of said cutter and showing the teeth thereon in operative relation to a shoe sole.

The cutter that is illustrated comprises, generally, a body 5 that has a hole 6 therein for mounting on a suitable arbor, a series of similar uniformly spaced flutes 7 integrally formed with the body, and a series of transversely arranged cutting teeth 8 integrally formed on the peripheral edge of each flute.

In practice, a circular blank of desired thickness and diameter is formed with transverse milling cuts 9 to thereby form the flutes 7. The greater the number of flutes on the cutter, the better efficiency will be obtained, the number, of course, being determined by the desired strength of the flutes. It has been found that some sixteen flutes for a cutter having a two-inch diameter, is a practical number.

The flutes 7 are preferably arranged tangent to a circle generated about the center of rotation of the cutter. In this manner each flute is formed with a cutting or penetrating edge 10 for a clockwise rotation of the cutter.

The teeth 8 are formed in the peripheral end of each flute. In this instance, nine such teeth are shown. The teeth are formed to have a narrow or small thickness relative to the spaces between adjacent teeth, the latter being uniform. In practice, the spaces or grooves 11 between the teeth are at least twice that of the tooth thickness, practicability dictating a tooth thickness of sufficient strength to withstand the cutting forces. The height or depth of each tooth is relatively large as compared to its thickness, the depth, as shown, being more than twice the thickness. In this manner, strong teeth that are relatively thin and have a height that permit suitable penetration, are provided integrally with the cutter flutes and body.

Figure 4:
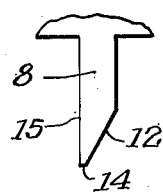
Figure 4 is an enlarged detail view of a modified form of cutter tooth.

According to the invention each tooth, in this case one hundred forty-four in number, is beveled or chamfered on one side as at 12 to form a relatively sharp edge 13. This edge, however, may be provided with a land of small transverse extent as shown at 14 of Figure 4 for greater strength with little or no loss in ability to penetrate the leather. The included angle between the straight side 15 and the bevel 12 is preferably acute and is of the nature of 30° whereby said teeth are sturdy. In practice, all of the bevels are provided on the same side of all the teeth.

It will be seen, that, by mounting the cutter on an arbor, rotating the same at high speed, and presenting the flesh side 16 of a leather sole to said cutter, a series of similar grooves 17 are formed in said sole. The force with which said sole is pressed toward the cutter, controls the depth of penetration of the cutter teeth. The resultant grooves 17 are formed rather by a parting of the leather than by a removal of any material. Hence, after glue or cement is applied to the grooved face of the sole and said sole brought into pressed engagement with an upper, said grooves will seek to close, because the displaced portions of the sole between the grooves will again seek to occupy their initial places.

Figure 3:
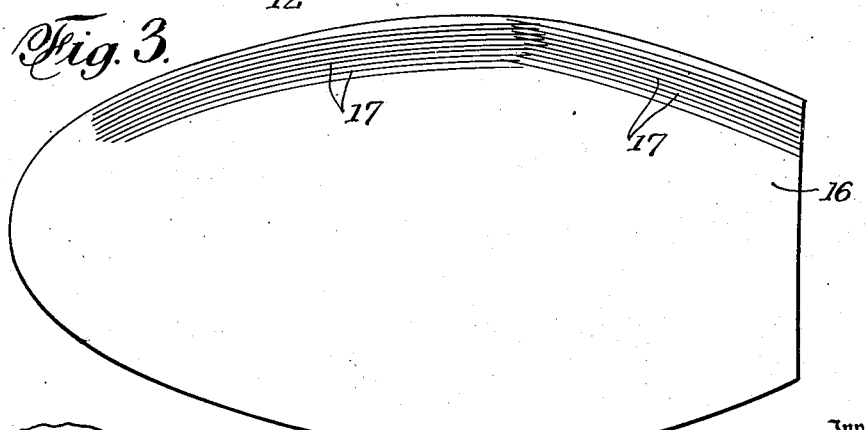
Figure 3 is the flesh side plan view of a shoe sole showing examples of grooves formed therein.

It will be noted from Figure 3 that the grooves 7 are formed by successive presentations of the sole to the cutter, the operation being a hand presentation. It will, therefore, be evident that any cutter which removes material, would mutilate the sole, unless extreme expertness is used. Further, should such an undesired cutter, cut through the edge of a sole, the relatively wide grooves would mar said sole edge, whereas, the self-closing properties of the grooves formed by the present cutter, render them unperceivable. Again, any overlapping of cuts made by the present cutter would not destroy the area of overlap.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims

Having thus described my invention, what I claim and desire to secure by Letters Patent is:

1. A leather grooving tool comprising an integral cylindrical body having a plurality of equally spaced flutes that are tangent to a circle generated about the center of the body, and a plurality of similar teeth formed on the peripheral edge of each flute, said teeth being arranged transversely of the flutes, and their thickness being less than one-half the space between teeth.

2. A leather grooving tool comprising an integral cylindrical body having a plurality of equally spaced flutes that are tangent to a circle generated about the center of the body, and a plurality of similar teeth formed on the peripheral edge of each flute, said teeth being arranged transversely of the flutes, and their thickness being less than one-half the space between teeth, each tooth being beveled on only one side and all the bevels being on the same side of the teeth.

3. An integral circular cutter for forming a series of grooves in the flesh side of leather soles comprising a plurality of equally spaced flutes that are tangent to a circle generated about the center of rotation of the cutter, and the peripheral end of each flute being integrally provided with a plurality of similar teeth each having a bevel on one side for cutting into the flesh side of a sole without removing a material portion thereof to form grooves that seek to close upon application of pressure to the opposite face of the sole.

4. An integral circular cutter for forming a series of grooves in the flesh side of leather soles comprising a plurality of equally spaced flutes that are tangent to a circle generated about the center of rotation of the cutter, and the peripheral end of each flute being integrally provided with a plurality of similar teeth each having a bevel on one side and thinner proportionally than the space between adjacent teeth for cutting into the flesh side of a sole without removing a material portion thereof to form grooves that seek to close upon application of pressure to the opposite face of the sole.

5. In a cutter of the character described and having a plurality of similar uniformly spaced flutes, a transverse series of groove-forming teeth that are more than twice as long as they are thick, having a thickness that is less than half the space between adjacent teeth, and each being beveled on one side only.

6. In a cutter of the character described and having a plurality of similar uniformly spaced flutes, a transverse series of groove-forming teeth that are each beveled on one side to form a sharp edge having leather penetrating properties, that are more than twice as long as they are thick whereby said penetration is effective for a substantial portion of each tooth, and that are spaced apart transversely a distance at least twice the thickness of the teeth whereby the separation of the leather by the teeth is accommodated by said spaces between them.

7. A leather grooving tool comprising an integral cylindrical body having a series of longitudinal milling cuts extending from the peripheral face of the body angularly inwardly to define a plurality of similar longitudinal flutes on the body that are tangent to a circle generated about the center of said body, the end of each flute having a uniformly spaced series of rectangular grooves defining uniformly spaced and parallel-sided peripheral teeth, the width of said grooves being more than twice the thickness of the teeth and the depth of said grooves being of such degree that the teeth are more than twice as long as they are thick, and one lateral face of each tooth being beveled and the bevels of all the teeth being on the same side.

ROMIE G. WINDHAM.

REFERENCES CITED

The following references are of record in the file of this patent:

UNITED STATES PATENTS

| Number | Name | Date |
| --- | --- | --- |
| 517,625 | Powers | Apr. 3, 1894 |
| 1,503,000 | Muller | July 29, 1924 |
| 2,070,441 | McClenathan | Feb. 9, 1937 |
| 2,230,924 | Bennett | Feb. 4, 1941 |

FOREIGN PATENTS

| Number | Country | Date |
| --- | --- | --- |
| 92,451 | Switzerland | Jan. 16, 1922 |
| 613,463 | France | Aug. 24, 1926 |